June 23, 1970 N. W. BELL 3,517,167

FEEDBACK LIGHT CONTROL SYSTEM

Filed Dec. 28, 1966

Inventor:
Norton W. Bell.
By Griffin & Branigan
Attys 3,517,167
FEEDBACK LIGHT CONTROL SYSTEM

Norton W. Bell, Pasadena, Calif., assignor to The Bell and Howell Company, Chicago, Ill.

Filed Dec. 28, 1966, Ser. No. 605,240
Int. Cl. G01n *21/30;* G06k *7/10*
U.S. Cl. 235—61.11 5 Claims

ABSTRACT OF THE DISCLOSURE

A reflective sensing type of document scanning apparatus in combination with an insertion machine wherein a lamp is powered by the output of a differential amplifier having a first input from a photodetector which detects reflected light from a document, and a second input from a reference voltage is described.

Apparatus for reading indicating marks on cards, paper, or tapes is well known in the computer and business machine art. The marks may be black marks on the surface of the card, tape, or paper or they may be holes in the card, tape, or paper. In the latter case, a lamp is located on one side of the card and a photodetector is located on the other side. Each time a hole passes between the light and the photodetector the photodetector generates an output pulse. In the former case, the lamp and photocell are both located on one side of the card. The light rays impinge on the card and are reflected by it to the photodetector. When a mark passes through the point of impinging light, the photocell detects less light and generates an output pulse.

This invention is related to the reflective type of card-reader. While reflective card readers have been widely used and are well known in the art, they have not proven to be entirely satisfactory in all circumstances. Basically, the output of reflective card readers depend upon changes in the reflectivity of a card's surface. That is, when a data mark causes the card's reflectivity to change, a photodetector generates a data output pulse. False output pulses are often created, however, by smudges or other similar marks on the card. One situation where smudges cause erroneous outputs is where cards are used in filling stations for recording credit purchases. That is, because of the environment in which these cards are used, they frequently receive grease or oil smudges. When data marks are added to these cards and they are run through a reflective card reader, therefore the stains and smudges frequently cause erroneous output pulses.

Therefore, it is an object of this invention to provide a new and improved reflective card reader that reduces the number of erroneous outputs caused by smudges and stains.

Because of different manufacturing techniques and processes the cards used in the data processing and business machine arts have different reflective abilities. It has been found that the reflective differences between some of these cards vary so widely as to require machine adjustments each time a new "batch" of cards is passed through a reflective card reader. If readjustments are not made, false outputs can occur. While readjustments are not too bothersome when large batches are sequentially passed under a read head, they become intolerable when cards from several batches are intermixed. Hence, it is desirable to provide a machine wherein individual readjustments for card reflectivity variations do not have to be made. It is a further object of this invention, therefore, to provide a new and improved reflective card reader wherein changes in the overall reflectivity of the cards do not cause erroneous outputs from the card reader.

It is a still further object of this invention to provide a new and improved card reader wherein individual physical readjustments do not have to be made for changes in card reflectivity.

Because reflective card readers depend upon the reflection of light from a lamp, any parameter that varies the amount of light emitted by the lamp can cause false output pulses. For example, the amount of reflected light may be varied by either deterioration of the light generating ability of the lamp for a fixed voltage or a fluctuation of the voltage applied to the machine. Therefore, it is a still further object of this invention to provide a new and improved reflective card reader wherein erroneous output signals are not caused by either a deterioration in the light emitting properties of the lamp; or fluctuations in the voltage applied to the machine.

In accordance with a principle of this invention, an electronic means for comparing signals is used to maintain the average amount of light impinging on the photodetector relatively constant. Specifically, a means for comparing two input signals has one input connected to the photodetector and the second input connected to a voltage source. The input from the comparing means is related to the difference between its input signals and is connected to the card reader's lamp. Hence, a feedback system is provided. That is, when the photodetector detects a reduced amount of light, the output voltage of the comparing means increases to increase the light intensity of the lamp. Consequently, when the reflectivity of a card changes, the light intensity changes to compensate for it. That is, if the reflectivity of the card decreases, the light received by the photocell also decreases so that the output from the comparing means increases and raises the lamp's intensity. This increase in lamp light intensity increases the amount of light being reflected to the photocell by the card to thereby compensate for the card's decreased reflectivity.

The system also operates in reverse; that is, if the light reflectivity of the card increases, the photodetected light also increases and reduces the voltage output from the comparing means to reduce the intensity of the light. Moreover, if the lamp deteriorates, thereby producing less light to be reflected, the system operates in a similar manner to compensate for that change. That is, as lamp intensity decreases the voltage applied to the lamp increases to compenate for the light decrease. Thus the lamp voltage need only be great enough to provide a minimum useable light output whereby the lamp's life is prolonged.

In accordance with a still further principle of the invention, the output from the photodetector is compared with the signal from a standard voltage source in a second comparing or "weighting" circuit which generates an output pulse when the photodetector output rapidly drops below a reference level. This rapid change in the photodetector's output occurs when a mark passes under the point where the lamp's rays are reflected from the card. By applying the same fixed voltage source to both the comparing means and the weighting means, compensation for voltage source fluctuation is provided. That is, if the voltage source drops by a fixed amount; it will have the same effect on the weighting circuit as on the comparing means. This is important because otherwise a sudden change in the lamp circuit's reference potential might indicate the presence of a mark when in fact no mark existed.

The above described structure is particularly well suited for use with insertion machines in which a master document is moved past a plurality of insertion stations which add other material to the master document. In these machines suitable indicia on a given master document are operative to control which of the insertion stations add material to the particular master document as it is moved past the insertion stations prior to being inserted into a mailing envelope by well-known means. A machine of this type is described in quite some detail in U.S. Pat. 3,260,517. These inserters are presently produced and marketed by the assignee of the present application, and well known in the market as the Phillipsburg inserters. Hence, it is another object of this invention to provide an improved insertion machine wherein the master document's indicia are read by an improved reflective sensor whose output is used to control selected insertion stations so that only specifically desired material is subsequently inserted into an envelope with a given master document.

In accordance with this aspect of the invention, the output pulses from the weighting circuit are applied to a control system which has a plurality of outputs connected to a plurality of insertion stations. The number of marks on a card determine the number of pulses "read" by the weighting circuit. These pulses are interpreted by the control network to selectively control insertions by the insertion stations. In this manner, selective insertions can be made to form a packet of the card being read and selected additional material such as advertising literature. By coding the marks for particular customers, customer oriented insertions are made.

The foregoing objects and many of the attendant advantages of this invention will become more readily appreciated as the same become better understood by reference to the following detailed description when taken in conjunction with the accompanying drawings, wherein.

Figure 1:
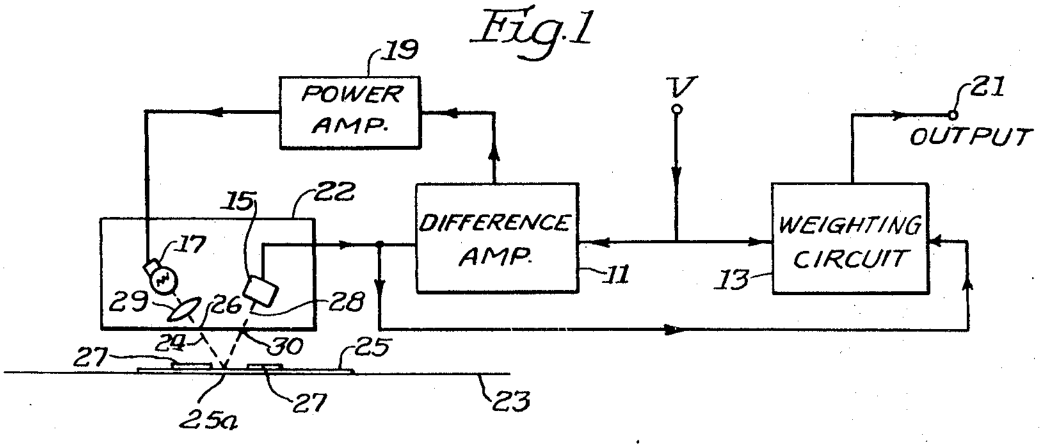
FIG. 1 is a block diagram illustrating the reflective card reader of the invention.

The system illustrated in FIG. 1 comprises a difference amplifier 11, a weighting circuit 13, a photodetector 15, a lamp 17 and a power amplifier 19. The photodetector 15 is connected to one input of the difference amplifier 11 and to one input of the weighting circuit 13. The second inputs to the difference amplifier 11 and to the weighting circuit 13 are connected to a common voltage source V. The output from the difference amplifier is connected through the power amplifier 19 to the lamp 17. The output from the weighting circuit is connected to an output terminal 21. The lamp 17 and the photodetector are suitably mounted by means not shown in a housing 22.

Also schematically illustrated in FIG. 1 are a plurality of marks 27 on a card 25 which is mounted on a portion of a conveyor belt 23. The conveyor belt moves in the direction of the arrow. Light from the lamp 17 passes along an axis 24, through a lens 29, also mounted in the housing 22 by means not shown. After passing through the lens the light is converged through an aperture 26 in the housing, and impinges on the card 25. This light is reflected by the card at point **25*a* along an axis 28 which passes through a second aperture 30 in the housing 22 and impinges on photodetector 15. As the conveyor 23 moves a card 25 through the point 25*a*, the reflective surface of the card determines the amount of light that is reflected to the photodetector. Hence, both smudges and data marks that pass through the point 25*a*** vary the amount of light reflected to the photodetector. In addition, the amount reflected light varies if the overall reflective surface of a card varies.

Turning to the operation of the feedback portion of the read head illustrated in FIG. 1, light from the lamp 17 impinges on the card 25 and is reflected to the photodetector 15. The intensity of the light emitted by the lamp 17 is under the control of the difference amplifier 11. The output voltage from the difference amplifier is the difference between its input voltages; that is, the difference between the voltage from the source V and the voltage from the photodetector 15. This voltage controls the light intensity of the lamp 17. When the amount of light impinging on the photodetector drops, the voltage output of the photodetector drops. The drop in photodetector impinging light can be caused by several factors such as lamp deterioration, a line voltage fluctuation, a card smudge, or perhaps a variation in the general reflectivity of the card, for example.

Because the reduction in the amount of reflected light reduces the output signal from the photodetector, the difference between the photodetector input and the fixed voltage input increases causing the difference amplifier to increase the voltage applied to the lamp 17 and increase lamp's intensity. Hence, the amount of light reflected to the photodetector increases to substantially compensate for whatever change caused the decrease in impinging light. Moreover, the system works in both directions; that is, the amount of light from the lamp increases or decreases in accordance with the decrease or increase in the amount of light impinging on the photodetector.

While the difference amplifier system of the invention compensates for general changes in impinging light, the changes due to data marks are not compensated for. This is so both because the conveyor belt moves cards past the reading elements in a rather rapid manner, and because of the inherent time delay in the response of the light source. Hence, at least for the case of an incandescent lamp, the output from the light source does not change rapidly enough to compensate for data marks and only changes rapidly enough to compensate for conditions that create a longer period of change in impinging light. In this respect, it should be noted that a rapid response type of gaseous lamp could also be used. If so, its response characteristics should be retarded by placing suitable circuit means in either the differential amplifier or the power amplifier. In either case, however, a small mark creates a pulse output from the photodetector while there are no output pulses from smudges or other factors which merely cause smooth or gradual changes in the light impinging on the photodetector.

It is to be understood that the photodetector output voltage does not remain exactly constant for changes in impinging light; rather, the photodetector output voltage remains only relatively constant. For example, if the amount of impinging light drops because of a decrease in a card's reflectivity, the output from the difference amplifier 11 increases. The increased output is further amplified by the power amplifier 19 to increase the intensity of the light from the lamp 17. This increased light output from the lamp causes the photodetector to increase its output until a balance between the light intensity output and the photodetector output is such that a null in the overall system occurs. However, this new photodetector output is slightly lower than the photodetector output prior to the change. In other words, for a decrease in impinging light, the voltage from the photodetector drops and the voltage to the lamp rises. This is continuous until the difference between the voltages from V and the photodetector causes the difference amplifier to apply sufficient voltage through the power amplifier to the lamp to cause the lamp to generate a light that maintains the desired voltage on the photodetector. Further, if an increase in impinging light occurs the system works in reverse to drop the voltage to the lamp 17.

It is to be further understood that preferably the voltage from the photodetector is close to the voltage from V. And, also preferably, the amount of amplification by the differential amplifier and the power amplifier is high so that a small change in photodetector voltage creates a large change in lamp voltage to maintain the output of the photodetector relatively constant for changes in impinging light.

Figure 2:
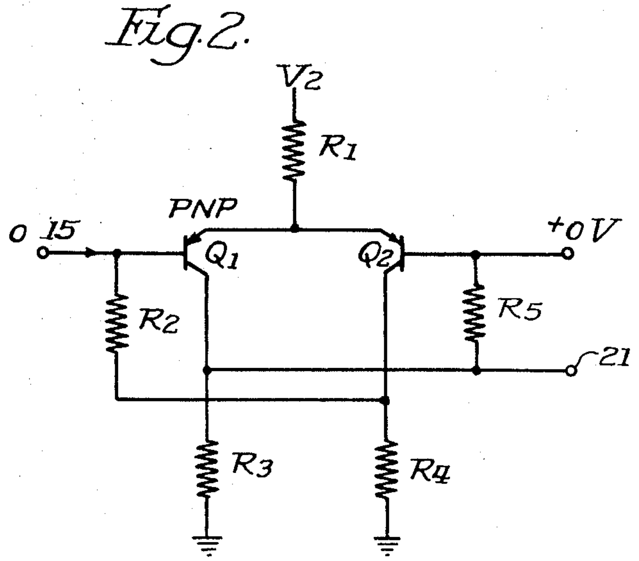
FIG. 2 is a schematic diagram illustrating a weighting circuit suitable for use in the embodiment of the invention illustrated in FIG. 1.

A weighting circuit that generates a pulse output when a mark passes under the reflection point of the lamp is shown in FIG. 2. The weighting circuit has one input connected to the common voltage source V and a second input connected to the photodetector 15. When a mark passes under the lamp, the weighting circuit generates an output pulse due to the rapid change in voltage conditions between its two inputs. The output pulse or pulses are then either used to control a machine or can be accumulated in registers or counters for any general computing or machine control function. Or, in accordance with the invention and as hereinafter described with respect to FIG. 3, the pulses are also useful to control the insertion of material in an insertion machine.

It will be appreciated that the reflective mark reading apparatus of the invention provides a simple means for compensating for reflectivity or other changes that affect a marked card reading operation. Such compensation prevents erroneous output pulses that could be created by smudges or other changes in the general reflecting ability of the cards. Further, lamp deterioration, photodetector deterioration, and deterioration in the amplifying ability of the power and difference amplifiers are compensated for. Moreover, the use of the same constant voltage input to the difference amplifier and the weighting circuit compensates for voltage source fluctuations that might otherwise produce erroneous outputs. That is, if the voltage from the fixed voltage source should increase or decrease because of ageing components; because the same voltage change is applied to both the difference amplifier and the weighting circuit, the voltage change does not cause an erroneous output. In other words, if the difference amplifier and the weighting circuit had independent reference voltages, and if one changed while the other did not, the weighting circuit might well provide an erroneous output. This does not happen to the inventive card reading apparatus because both of these circuits are referenced to the same fixed voltage source.

FIG. 2 is a schematic diagram of a weighting circuit suitable for use in the embodiment of the invention illustrated in FIG. 1. The circuit illustrated in FIG. 2 comprises a pair of PNP transistors designated Q–1 and Q–2, respectively. R–1 is connected between a bias voltage source V2 and the emitters of Q–1 and Q–2. The collector of Q–1 is connected through R–3 to ground and the collector of Q–2 is connected through R–4 to ground. The junction between the collector Q–2 and R–4 is connected through R–2 to the base of Q–1 and R–3 is connected through R–5 to the base of Q–2. The base of Q–2 is also adapted for connection to the output of the photodetector 15. Finally, the junction between the collector of Q–1 and R–3 is connected to the output terminal 21. It will be appreciated by this connection that there is a difference between the voltages at the bases of Q–1 and Q–2. Further, the feedback resistor R–2 provides a small amount of positive feedback to enhance the voltage change of the input signal and a clean pulse output for a rapid change in the level of the input.

In operation, Q–1 and Q–2 are normally biased on and there is a small output voltage because of the slight difference in the input voltages. When a drop occurs in the input to Q–1 because the photodetector sees a mark, Q–1 conducts more current than Q–2 and the voltage at terminal 21 increases. When the input to Q–1 again rises, Q–1 drops back to its original state and the voltage at terminal 21 drops to its former level. Hence, a pulse is generated at the output terminal 21 for a rapid fall-rise of the input to Q–1. As will now be described, this output is applied to an insertion control network to control insertions in an insertion machine.

Figure 3:
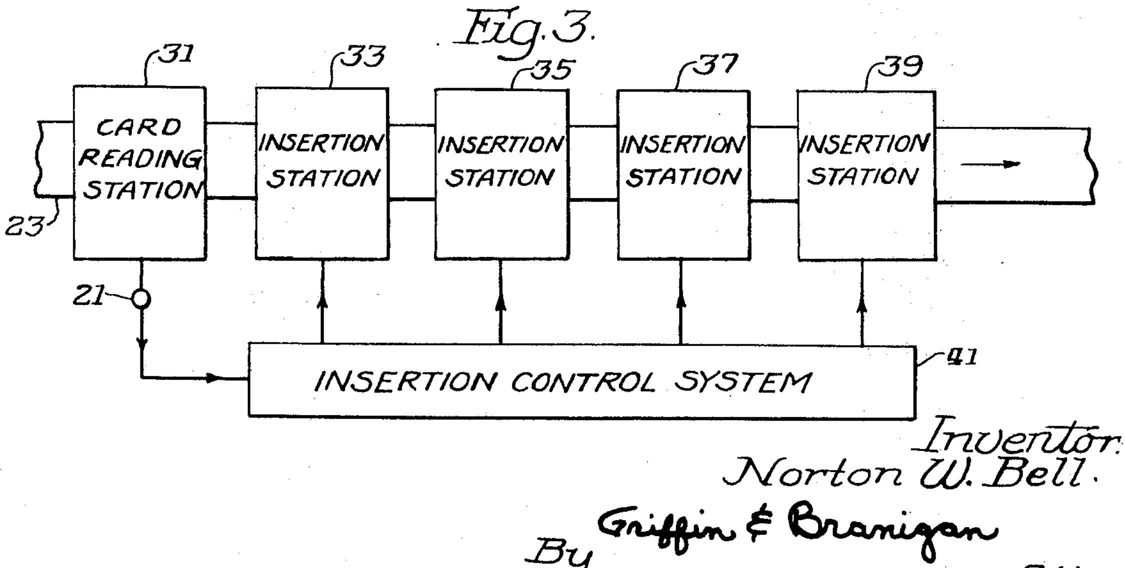
FIG. 3 is a block diagram illustrating an apparatus made in accordance with the invention for selectively inserting material into a packet.

FIG. 3 is a top view in block diagram form of an insertion machine that incorporates the above described reflective card reader. The system illustrated in FIG. 3 comprises a card read station 31, a first insertion station 33, a second insertion station 35, a third insertion station 37, a fourth insertion station 39 and an insertion control system 41. Insertion controls of the type contemplated are more fully described in my copending application Ser. No. 605,273 on an "Insertion Machine Control System"

which is commonly assigned and filed on even date herewith. A conveyor belt 23 is also illustrated in FIG. 3 as passing beneath the card read station 31 and the four insertion stations 33, 35, 37, and 39.

The output from the card read station 31 is the output from terminal 21 of FIGS. 1 and 2 and is applied to the input of the insertion control 41. The insertion control has four outputs—one output is connected to each of the insertion stations. Finally, the conveyor belt moves in the direction of the arrow; i.e., from left to right, and passes first beneath the card read station and then sequentially beneath each of the insertion stations.

In operation, a card is placed on the belt 23 by any suitable means not shown and is moved by the belt past the card read station 31. The card read station reads marks on the card in the manner hereinabove described. For each mark a pulse is generated and applied to the insertion control 41. In accordance with the number of marks read, the insertion control energizes one or more of the insertion stations. Preferably, the insertion control provides a time delay to each insertion station making the insertion. Subsequent to the card passing all of the insertion stations, the card and the inserts may be inserted into an envelope for example by means not shown. Hence, the end result is a machine for inserting a package of materials into an envelope where the types of insertions are made in accordance with the marks on a card.

It will be appreciated by those skilled in the art, and others, that the invention may be practiced otherwise than as specifically described herein. For example, the reflective card reading apparatus of the invention may be used for reading marked test papers in an automatic test grading machine—or the card reader could be used to detect marks on a tape rather than a card. In addition, depending upon the voltages used and the desired polarity of the pulse output in the system, NPN transistors—as opposed to PNP transistors—could be utilized in the weighting circuit illustrated in FIG. 2. Hence, the invention may be practiced otherwise than as described herein.

The embodiments of the invention in which an exclusive property or privilege is claimed are defined as follows:

1. Apparatus for maintaining the amount of light reflected from a moving object in a reflective photodetector reader at a relatively constant average level while allowing a pulse to be generated when a rapid change in the amount of light reflected occurs, comprising:

- a fixed voltage source;
- comparing means for comparing signals, said comparing means having two inputs, one input connected to said fixed voltage source;
- a photodetector having its output connected to the second input of said comparing means;
- a lamp connected to the output of said comparing means and mounted so as to impinge on said moving object, said photodetector being mounted so as to detect on its photosensitive surface light reflected by said object; and,
- a weighting circuit having two inputs, one input connected to said fixed voltage source and the other input connected to the output of said photodetector, said weighting circuit having an output connected to an output terminal.

2. Apparatus as claimed in claim 1 wherein said comparing means is a difference amplifier.

3. Apparatus as claimed in claim 2 including a power amplifier connected between said difference amplifier and said lamp means.

4. Apparatus according to claim 3 wherein said difference amplifier maintains the average amount of light reflected to the photodetector at a relatively constant level for changes in the general reflecting ability of the item being read and wherein said weighting circuit generates a pulse output when a small mark passes the point where light from said lamp means impinges on the item being read but does not generate an output for a slow change in the general reflecting ability of the item being read.

5. Apparatus according to claim 4 wherein said weighting circuit is a difference amplifier.

References Cited

UNITED STATES PATENTS 3,051,69 8/1962 Richards ______________ 315—156

OTHER REFERENCES

Prot, "Control and Regulation System for Photocell

Sensing Devices," IBM Technical Disclosure Bulletin, vol. 7, No. 9, February 1965, p. 841.

Kline, "Mark Sensing by Reflectance Ratio Determination," IBM Technical Disclosure Bulletin, vol. 8, No. 9, February 1966, pp. 1294 and 1295.

DARYL W. COOK, Primary Examiner

T. J. SLOYAN, Assistant Examiner

U.S. Cl. X.R.

250—219